(No Model.)
A. P. GOODELL.
POTATO DIGGER.
No. 533,288. Patented Jan. 29, 1895.
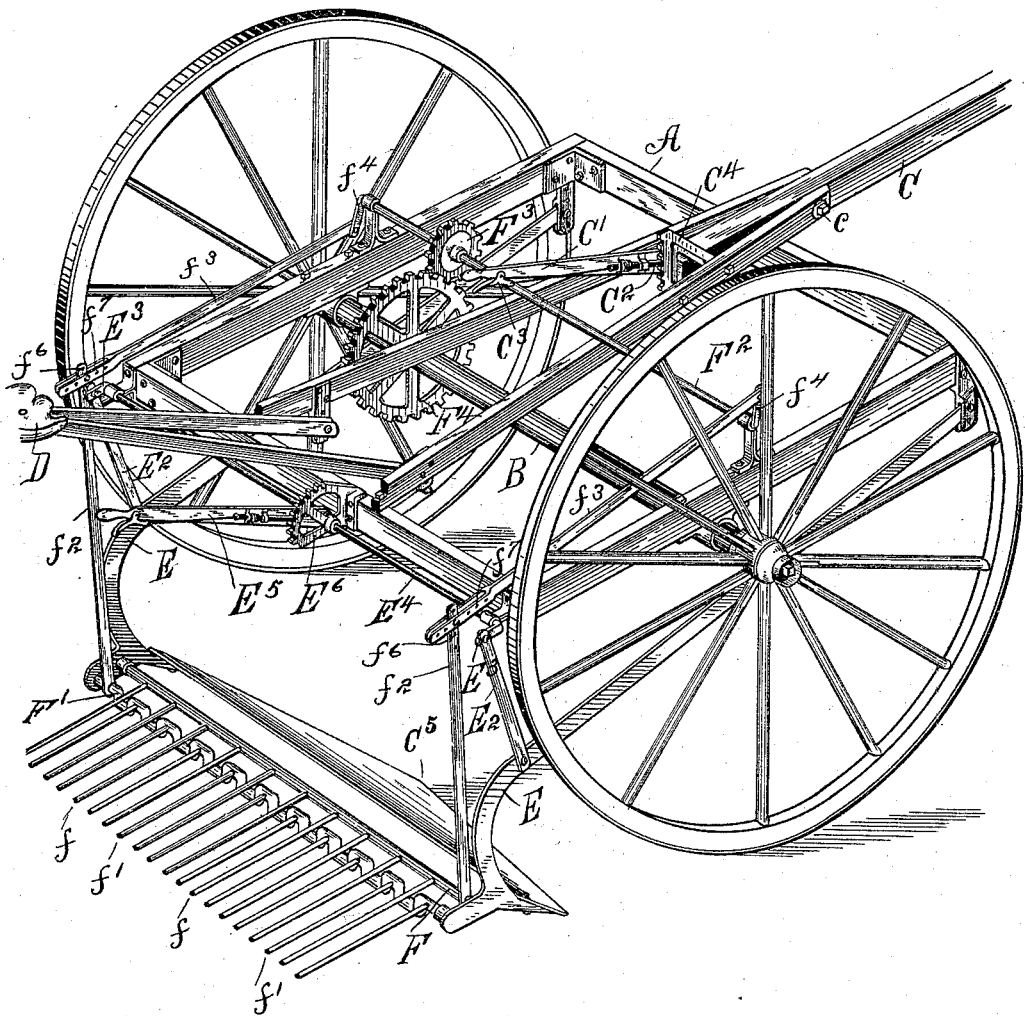
WITNESSES
D. W. Bradford
F. Clough
INVENTOR
Alfred P. Goodell
by Parker & Burton
his Attorneys.

UNITED STATES PATENT OFFICE.

ALFRED P. GOODELL, OF WHITE LAKE, MICHIGAN.

POTATO-DIGGER.

SPECIFICATION forming part of Letters Patent No. 533,288, dated January 29, 1895.

Application filed June 22, 1891. Renewed August 10, 1894. Serial No. 519,956. (No model.)

*To all whom it may concern:*

Be it known that I, ALFRED P. GOODELL, a citizen of the United States, residing at White Lake, county of Oakland, State of Michigan, have invented a certain new and useful Improvement in Potato-Diggers; and I declare the following to be a full, clear, and exact description of the invention, such as will enable others skilled in the art to which it pertains to make and use the same, reference being had to the accompanying drawing, which forms a part of this specification.

The drawing is a perspective of a potato digger made in accordance with my invention.

My invention relates to that form of a potato digger in which the potatoes, after being loosened by the digger, pass onto a grate and are there separated from the soil by the agitation of the grate, and more particularly of a form where the grate consists of a series of fingers; and my invention consists of an improved method of agitating the fingers, and in the peculiar arrangement and form of the rock shafts on which the fingers are mounted, whereby every alternate finger is attached to one bar and the remaining fingers to the other bar, and in an arrangement whereby the two bars may be actuated simultaneously, and one set of fingers ascend while the remaining fingers descend, and whereby the throw of the fingers may be varied; also in other novel features of construction hereinafter specified, and more particularly pointed out in the claims.

In carrying out my invention, A represents the frame of the machine; B, the axle; C, the pole. The pole is pivoted at $c$, and at its rear end is a handle C' attached to the pole and provided with a detent $C^2$ actuated by a handle $C^3$.

$C^4$ is a segment connected with the frame, the construction being such that the operator can at will engage the detent, raise or lower the rear end of the pole, and re-engage the detent with the segment, thus locking the pole in its new position, thereby giving any desired general set to his frame and through it to the digger.

D is the driver's seat.

E represents the draft bars, which are curved downward at their rear ends, and support at their extremities the digger or blade E'. This blade projects forward at its middle point $C^5$, so that it enters and passes through the ground with more or less of a drawing cut, and this construction stiffens the blade.

$E^2$ represents links rising from the draft bars E and engaging with the projections or cranks $E^3$ upon the tilting shaft $E^4$.

A handle $E^5$ is located adjacent to the rider, which sweeps over a segment $E^6$, by which the rider may raise or lower the digger, lifting it entirely out of the ground, or giving it any desired depth of cut, and may secure the same in any position of adjustment through the medium of the segment.

F and F' represent two rocking finger bars. They are arranged in the same or substantially the same horizontal plane, so as to occupy as little vertical space as possible. Each alternate finger $f$ is attached to the rock shaft F, while the remaining fingers $f'$ are attached to the rock shaft F'. $f^2$ represents a lever of which one rises from each of the said rock shafts. The top of each lever is connected by a rod $f^3$ with the crank $f^4$ on the ends of the crank shaft $F^2$. Upon this crank shaft $F^2$ is a gear wheel $F^3$, which engages with a gear wheel $F^4$ on the axle of the machine, so that as the machine is drawn along, the motion of the axle is transmitted through the crank shaft $F^2$ to the rock shafts F and F', causing them to rock back and forth, giving to the fingers $f$ and $f'$ a rising and falling motion.

It is apparent that if the wrist pins of the cranks $f^4$ are similarly located at both ends of the crank shaft, the fingers $f$ and $f'$ will be maintained always in the same plane, and caused to rise and fall together. If these wrist pins are upon diametrically opposite sides of the crank shaft, then as the fingers $f$ rise, the fingers $f'$ fall, and vice versa. Again, the amount of the vibration will be determined by the distance of the wrist pins from the center of motion of the crank shaft, and the cranks may be provided with adjustable wrist pins, if desired, but the ordinary adjustment of the throw of the fingers can be made by means of the series of holes $f^6$ in the upper part of the levers $f^2$, and the pitch or angle of the fingers in the first instance can be adjusted by means of the holes $f^7$ in the connecting rods $f^3$.

I avoid the interference between the rock shaft F' and the fingers attached to the rock shaft F, by providing shaft F' with depressions between each of its fingers. Other methods may be used to avoid this interference, such as providing the fingers with a bend at the end next the rock shafts.

What I claim is—

1. The combination with the frame, the digger or blade and its support, of the two finger shafts F and F' with their fingers arranged to vibrate in alternate spaces, and mechanism for vibrating said finger shafts in opposite directions, whereby the fingers of one shaft are caused to rise as the fingers of the other shaft are caused to fall, and vice versa, substantially as described.

2. The combination of the following elements, the frame, the digger, draft bars for supporting the same, and means for vertically adjusting the said digger, and in connection therewith two finger bars with alternating teeth, their actuating levers $f^2$, the crank shaft $F^2$ geared with the axle, and connecting bars or rods engaging the cranks on the said crank shaft with the said levers $f^2$ respectively, substantially as described.

3. The combination, with the shaft F and its fingers $f$, of the shaft F' with its fingers $f'$, the latter constructed to vibrate its fingers between the fingers $f$, and arranged as described to avoid interference of either set of fingers with the other set of fingers of their respective shafts, substantially as described.

4. The combination, with the shaft F and its fingers $f$, of the shaft F' and its fingers $f'$, the latter shaft having depressions between its fingers to avoid interference with the fingers as the latter are vibrated, substantially as described.

In testimony whereof I sign this specification in the presence of two witnesses.

ALFRED P. GOODELL.

Witnesses:
JAMES ENGLAND,
C. E. EVERTS.